United States Patent [19]

Hilger et al.

[11] Patent Number: 4,770,681
[45] Date of Patent: Sep. 13, 1988

[54] DUST SEPARATOR FOR GAS STREAM

[75] Inventors: Timothy J. Hilger, St. Charles; Kevin L. Noe, South Elgin, both of Ill.

[73] Assignee: Elgin Sweeper Company, Elgin, Ill.

[21] Appl. No.: 96,550

[22] Filed: Sep. 14, 1987

[51] Int. Cl.$^4$ ............................................. B01D 46/40
[52] U.S. Cl. ........................................ 55/429; 55/432; 55/447; 55/465
[58] Field of Search ................. 55/429, 432, 443, 444, 55/447, 462, 465

[56] References Cited

U.S. PATENT DOCUMENTS

| | | | |
|---|---|---|---|
| 2,244,372 | 6/1941 | Pomeroy | 55/465 X |
| 4,218,226 | 8/1980 | Boozer | 55/432 X |
| 4,224,043 | 9/1980 | Dupre | 55/432 X |
| 4,557,739 | 10/1985 | Fortman et al. | 55/444 X |
| 4,708,723 | 11/1987 | Howeth | 55/429 X |

FOREIGN PATENT DOCUMENTS 0638313  5/1928  France ................................. 55/443

Primary Examiner—Charles Hart
Attorney, Agent, or Firm—Charles F. Pigott, Jr.; Garrettson Ellis

[57] ABSTRACT

A dust trap for flowing gases comprises an inlet conduit which terminates in a transverse wall for impact-type dust separation (i.e. inertial separation). A side entry port is positioned adjacent the transverse wall. The side entry port communicates with the circulation chamber defining an angled opposed wall in the opposite side of the chamber of the side entry port. The angled, opposed wall is substantially perpendicular to gas flow through the side entry port, to cause flowing gas from the side entry port to split vertically into swirling upward and downward flow patterns for further dust separation. The lower part of the circulation chamber is normally closed off from the exterior. The upper part of the circulation chamber communicates with an outlet conduit.

16 Claims, 2 Drawing Sheets

DUST SEPARATOR FOR GAS STREAM

BACKGROUND OF THE INVENTION

There are numerous situations where dust or other particulate matter should be separated from a stream of flowing gas. In particular, street sweepers utilize a strong air suction to pick up dust which is drawn into a debris collection hopper within the street sweeper, with the air passing on out of the hopper, impelled by a centrifugal pump or the like.

The dust-laden air cannot be spewed into the atmosphere without thwarting the main purpose of the street sweeper. If filters are used, they become clogged very quickly because of the high quantities of dust picked up by the street sweeper. Accordingly, some street sweepers use a recirculating flow of air to keep the collected dust within the sweeper. However, the concentration of dust that flows along with the air becomes unduly high, and requires a dust trap which does not utilize a filter.

While numerous designs of dust traps are known, many of them have excessive pressure losses as an inevitable part of effective dust collection. In accordance with this invention, a dust trap which does not use a filter is provided which combines a low pressure loss with efficient separation. Also, besides having an improved combination of low pressure loss and good dust separation, the dust trap of this invention is of simple construction, and the collected dust is easily removed from it. Thus, an improvement in both efficiency of operation and cost of construction and operation is provided by the invention of this application.

DESCRIPTION OF THE INVENTION

In accordance with this invention, a dust trap for flowing gases is provided, comprising an inlet conduit which terminates in a transverse wall for impact-type dust separation and a side entry port communicating with a circulation chamber defining an angled, opposed wall on the opposite side of the chamber from the side entry port. The angled, opposed wall is substantially perpendicular to gas flow through the side entry port, to cause flowing gas from the side entry port to split vertically into swirling upward and downward patterns for further dust separation. The lower part of the circulation chamber is normally closed off from the exterior to provide a relatively stagnant area in which the dust can collect. The upper part of the circulation chamber communicates with an outlet conduit for the flowing gases.

The outlet conduit may preferably be defined by a hood member with an open top. The hood member defines a pair of angled sides that meet in a vertically linear apex facing the gas flow through the side entry port, to cause flowing gas from the side entry port to split horizontally into separate swirling flow patterns for further dust separation, prior to being impelled through the open top into the outlet conduit. The swirling, centrifugal flow provided in accordance with this invention tends to concentrate dust in the outer regions of such centrifugal flow, from where dust particles can agglomerate and fall downwardly toward the bottom of the dust trap. The hood member can be carried on the opposed wall.

A lower portion of the angled, opposed wall may define an aperture communicating with a dust collection bin. A portion of the angled, opposed wall may extend forwardly and downwardly beyond the apex of the hood member, to facilitate creation of a stagnant area below the portion of the opposed wall referred to above in the dust collection bin.

Additionally, it is preferred for a guide wall to be provided extending inwardly from the side entry port at a direction which is substantially perpendicular to the angled, opposed wall. The guide wall terminates short of the angled, opposed wall. Typically, a chamber-defining wall is connected to the end of the guide wall nearest the angled, opposed wall, the chamber-defining wall being angled to the guide wall and extending from the guide wall to define one side of the circulation chamber which extends under the guide wall to transversely enlarge the circulation chamber. Thus, the bottom of the circulation chamber may have greater transverse area than a central portion thereof, while the top of the circulation chamber also has greater transverse area as well, measuring from the apex of the hood horizontally to the chamber-defining wall and the guide wall.

Additionally, the circulation chamber may define at least one door member for removing collected dust. Preferably, the door member tends to spontaneously close when the dust trap is in its position of use, and to spontaneously open when the door member is tipped open to a dumping position. Thus, collected dust in the circulation chamber can be easily removed, and easy access is provided for hosing down the inside of the chamber and the like.

Also, the dust collection bin may also have a door member which spontaneously closes in position of use, and spontaneously opens in the dumping position for similar purposes of removal of collected dust and cleaning of the interior while the dust trap is in the dumping position.

DESCRIPTION OF SPECIFIC EMBODIMENT

Figure 1:
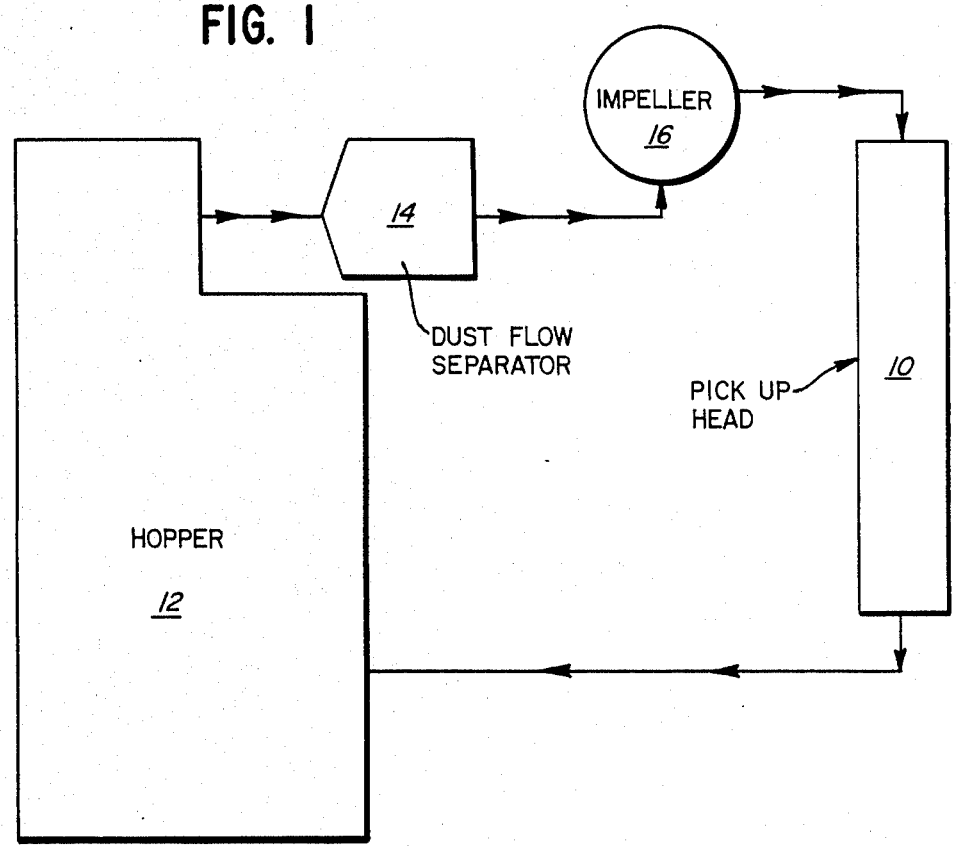
FIG. 1 is a schematic diagram of a pumped air flow stream in a street sweeper in which the air flow stream is used to help pick up debris from the street and deposit it in a hopper, showing typical positioning of the dust trap of this invention.

Referring to the drawings, FIG. 1 shows a diagramatic view of the air flow system of a typical street sweeper in which the flowing air is recirculated so as not to throw dust along with exhaust air out of a sweeper. Pick-up head 10 is typically positioned adjacent the brushes of a street sweeper, and is of a conventional design to pick up dust and debris which has been disturbed by the brushes. The air stream passes from pick-up head 10 to hopper 12 where larger pieces of debris are collected. Air in the flow stream is exhausted from the top of hopper 12, passing through dust trap 14 in accordance with this invention. From there, flowing air passes from dust trap 14 to impeller 16 which is typically a large, centrifugal air pump. From there, the circulating air passes back through pick up head to pick up more dust and other debris.

Figure 3:
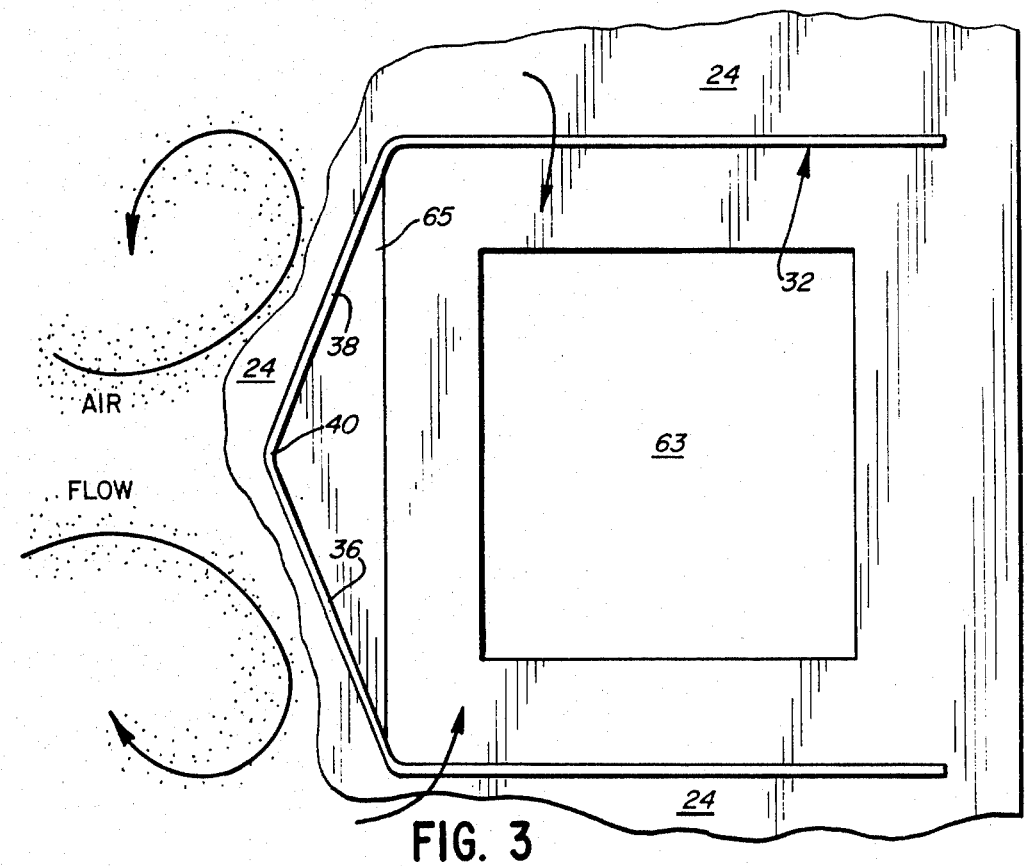
FIG. 3 is a top view of the dust trap as seen from line 3—3 of FIG. 2.
Figure 2:
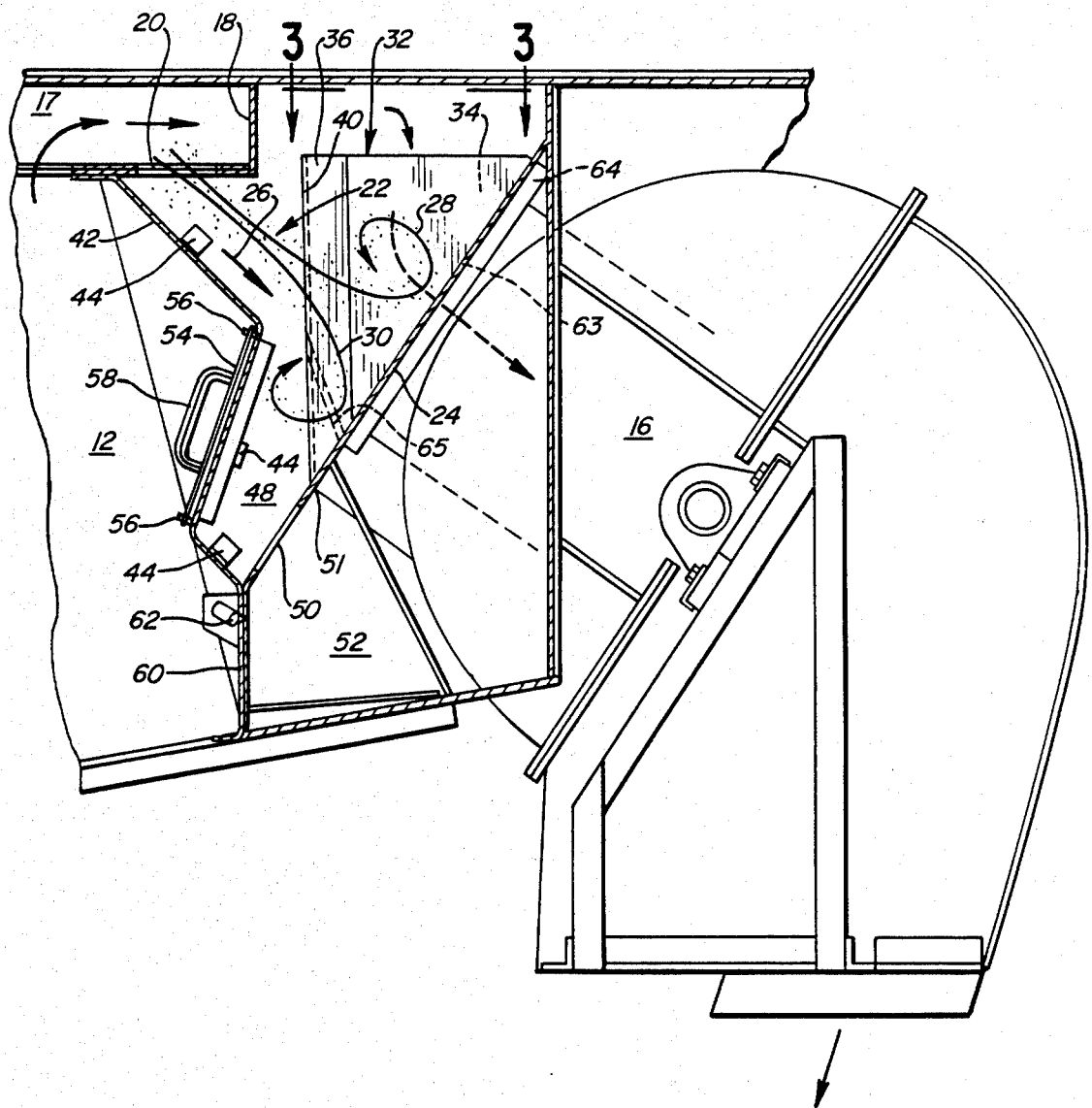
FIG. 2 is a vertical sectional view of the dust trap of FIG. 1.

FIGS. 2 and 3 show details of dust trap 14 in accordance with this invention.

Air passes from the top of hopper 12 into plenum 17, moving in a horizontal direction to impinge against end wall 18. There, the air is forced to abruptly change direction to pass through port 20, which can be seen to be in side relation to wall 18. Because of this, an initial amount of dust separation takes place by an inertial or impact-type dust separation. This is based on the principle that the granules of dust are of greater density than the carrying air. Accordingly, when the stream of air and dust is forced to make an abrupt turn, as caused by end wall 18 and port 20, the inertia of the dust particles is greater than the inertia of the air, causing the dust particles to be less maneuverable and to agglomerate together adjacent wall 18. Then, the agglomerated, concentrated dust particles tend to fall downwardly through port 20 in a flow pattern which is somewhat different from the flow of the air itself.

As the air passes through side entry port 20, it enters circulation chamber 22, generally moving downwardly at an acute angle to the vertical in a stream until it encounters angled, opposed wall 24 on the opposite side of chamber 22 from side entry port 20. It can be seen that angled, opposed wall 24 is approximately perpendicular to the general direction 26 of gas flow through side entry port 20.

The effect of this is to cause flowing gas to impinge a second time against a transverse surface, the first impingement being at end wall 18 and the second being at opposed wall 24. This provides another moment of inertial or impact-type dust separation, tending to concentrate the dust along transverse wall 24, from where it can fall downwardly. Additionally, the presence of angled, opposed wall 24 can cause air flow 26 to divide into a pair of centrifugal vortices of air flow. One such air flow vortex 28 goes upwardly in centrifugal manner, while the other air flow vortex 30 goes downwardly. This centrifugal flow action provides further dust separation, since the denser dust particles tend to migrate to the outer reaches of the centrifugal flow because of their greater density, where they may be further concentrated and agglomerated, to fall downwardly in circulation chamber 22.

Additionally, hood member 32 is provided, having an open top 34 in an upper portion of dust trap 14. Circulating air leaves the dust trap through open top 34 of hood 32.

Hood 32 defines a pair of angled sides 36, 38 that meet in a vertically linear apex 40, which faces gas flow 26 through side entry port 20. Hood 32 is carried on angled, opposed wall 24, with sections of wall 24 being open and available for air circulation on either side of hood 32.

The effect of the presence of hood 32, and the angled sides 36, 38, plus vertically linear apex 40, is that air flow 26 not only is driven into an upward vortex 28 and a downward vortex 30, but the air flow on either side of hood 32 forms a centrifugal vortex having a significant horizontal component as the airstream impacts against angled sides 36, 38. Thus hood 32 behaves rather like the bow of a ship passing through water. This added, horizontal vortex component provides additional centrifugal separation for dust particles in circulation chamber 22.

Thus, the dust trap of this invention provides both impact-type dust separation and centrifugal dust separation, causing agglomeration and concentration of the dust particles which, in turn, tend to increase the rate of drop of the dust in the flowing air so that the dust tends to drop downwardly more rapidly because of such a flow pattern.

An angled guide wall 42 is provided, being attached by some of brackets 44 to side walls. Guide wall 42 extends inwardly from side entry port 20 at a direction which is substantially perpendicular to the the angled, opposed wall 24, but terminating short of the angled opposed wall.

A chamber defining wall 46 is connected to the end of guide wall 42 which is nearest to angled, opposed wall 24. The chamber defining wall is angled to guide wall 42 as shown in FIG. 2, and extends from the guide wall to define part of one side of circulation chamber 22. This angular relationship permits circulation chamber 22 to extend under guide wall 42 in its lower portion 48 to provide relative transverse enlargement of the lower portion of circulation chamber 48 (relative to linear apex 40). Thus, there is provided in the lower portion of chamber 22 a somewhat enlarged, relatively stagnant area, when compared with upper portions of chamber 22, to serve as a dust collection and concentration area.

Also, a lower portion of angled, opposed wall 24 defines an aperture 50, communicating between the lower portion 48 of circulation chamber on one side thereof and a dust collection bin 52 on the other. A portion 51 of angled, opposed wall 24 extends forwardly and downwardly beyond linear apex 40, separating aperture 50 from apex 40, to facilitate creation of a stagnant area below wall portion 24 in dust collection bin 52. This further facilitates the settling and collection of the dust.

Thus, as dust-laden air passes through the dust trap of this invention, a series of different dust separation mechanisms work together in spontaneous manner, without moving parts, to concentrate the dust and to urge it downwardly for collection in dust collection bin 52.

To empty the dust trap of this invention, double doors 54, each carried on hinges 56 and having central handles 58, are provided without latching and positioned on the chamber defining wall 46, which is preferably angled in a manner to urge double doors 54 to stay in the closed position when the dust trap is in its operating position as shown in FIG. 2. For dumping of dust, or for other access to the system, the dust trap may be tilted with the top portion relatively rotating to the left from the viewpoint of FIG. 2, causing double doors 58 to fall open in the dumping position.

Additionally, another door 60, typically of trap door type, having conventional floating hinge 62, may also open in the dumping position for removal of dust from bin 52. Then, when the dust trap is returned to its vertical, normal position of FIG. 2, all doors close again in spontaneous manner.

Exhaust air passing through hood 32 extends through aperture 63, sealed by sealing member 64, into the inlet of centrifugal pump 16. There, the motive power for the recirculation of the entire air stream is provided, with the air being accelerated through pump 16, back into pick-up head 10 for picking up more debris and dust. Baffle 65 provides a smoother flow contour into pump 16.

Centrifugal pump 16, pick up head 10, hopper 12, and other ancillary parts of the flow system disclosed herein may be of conventional design. The dust trap of this invention may be made of bolted and welded sheet steel or the like in conventional manner, other than those specific departures from the prior art as described above.

Thus, a simple dust trap without moving parts or replaceable filter elements is provided, in which efficient dust removal is coupled with a low flow resistance to the air, so that the system may be operated with relatively low expense in energy. It may be used not only in street sweeper machines, but in any desired use where the removal of dust from a stream of gases is desired. For example, it may be used for the removal of particulate exhaust gases, for example flue gases from large boilers or from chemical reactors. It may be used to remove particulate from vehicle exhaust. It may be used for removing dust from intake air for all kinds of machines or the like, to preserve their useful life and operation.

The above has been offered for illustrative purposes only, and is not intended to limit the scope of this invention, which is as defined in the claims below.

That which is claimed is:

1. A dust trap for flowing gases, which comprises: an inlet conduit which terminates in a transverse wall for impact-type dust separation, and a side entry port adjacent said transverse wall, said side entry port communicating with a circulation chamber defining an opposed wall on the opposite side of the chamber of the side entry port, said opposed wall being substantially perpendicular to gas flow through said side entry port; and an outlet conduit defined by a hood member with an open top, said hood member defining a pair of angled sides that meet in a vertically linear apex facing said gas flow through said side entry port, to cause flowing gas from said side entry port to split horizontally into separate, swirling flow patterns for dust separation, while flowing gas which impinges said opposed wall is split vertically into swirling upward and downward flow patterns for futher dust separation, the lower part of said circulation chamber being normally closed off from the exterior, the upper part of said circulation chamber communicating with said outlet conduit.

2. The dust trap of claim 1 in which a lower portion of said opposed wall defines an aperture communicating with a dust collection bin.

3. The dust trap of claim 2 in which a portion of said opposed wall extends forwardly and downwardly beyond said apex, to facilitate creation of a stagnant area below said opposed wall portion in said dust collection bin.

4. The dust trap of claim 1 in which a guide wall is provided extending inwardly from said side entry port at a direction substantially perpendicular to said opposed wall, said guide will terminating short of said opposed wall.

5. The dust trap of claim 4 in which a chamber-defining wall is connected to the end of said guide wall nearest said opposed wall, said chamber defining wall being angled to said guide wall and extending from said guide wall to define part of one side of said circulation chamber which extends under said guide wall to transversely enlarge said circulation chamber.

6. The dust trap of claim 1 in which said dust trap defines at least one door member for removing collected dust, said door member tending to spontaneously close when the dust trap is in its position of use, said door member tending to spontaneously open when the door member is tipped over to a dumping position.

7. A dust trap for flowing gases which comprises: an inlet conduit which terminates in a transverse wall for impact-type dust separation, and a side entry port adjacent said transverse wall; said defining and angled, opposed wall on the opposite side of the chamber from the side entry port, said angled, opposed wall being substantially perpendicular to gas flow through said side entry port; and an outlet conduit defined by a hood member with an open top, said hood member defining a pair of angled sides that meet in a vertically linear apex facing said gas flow through said side entry port, to cause flowing gas from said side entry port to split horizontally into separate, swirling flow patterns for dust separation prior to being impelled through said open top into the outlet conduit, and flowing gas impinging on said transverse wall is split vertically into swirling upward and downward flow patterns for further dust separation, the upper part of said circulation chamber communicating with said outlet conduit, the lower part of said circulating chamber being normally closed off from the exterior but defining an aperture communicating with a dust collection bin, said dust collection bin defining at least one door member for removing collected dust, said door member tending to spontaneously close when the dust trap is in its position of use, said door member tending to spontaneously open when the door member is tipped over to a dumping position.

8. The dust trap of claim 7 in which a lower portion of said angled, opposed wall defines said aperture communicating with the dust collection bin.

9. The dust trap of claim 8 in which a portion of said angled, opposed wall extends forwardly and downwardly beyond said apex, to facilitate creation of a stagnant area below said wall portion in said dust collection bin.

10. The dust trap of claim 9 in which a guide wall is provided extending inwardly from said side entry port in a direction substantially perpendicular to said angled, opposed wall, said guide wall terminating short of said angled, opposed wall.

11. The dust trap of claim 10 in whihh a chamber-defining wall is connected to the end of said guide wall nearest said angled, opposed wall, said chamber-defining wall being angled to said guide wall and extending from said guide wall to define part of one side of said circulation chamber which extends under said guide wall to transversely enlarge said circulation chamber.

12. A dust trap for flowing gases which comprises: an inlet conduit communicating with a circulation chamber defining an angled, opposed wall on the opposite side of the chamber of said entry port, said angled, opposed wall being substantially perpendicular to gas flow through said inlet conduit, to cause flowing gas from said inlet conduit to split vertically into swirling upward and downward flow patterns for further dust separation, the lower part of said circulation chamber being normally closed off from the exterior, the upper part of said circulation chamber communicating with an outlet conduit, said outlet conduit being defined by a hood member with an open top, said hood member defining a pair of angled sides that meet in a vertically linear apex facing said gas flow through the inlet conduit, to cause flowing gas from said conduit to split horizontally into separate swirling flow patterns, whereby dust separation takes place in the majority of gases passing therethrough prior to said gases being impelled through said open top into the outlet conduit.

13. The dust trap of claim 12 in which a guide wall is provided extending inwardly from said inlet conduit in a direction substantially perpendicular to said angled, opposed wall, said guide wall terminating short of said angled, opposed wall.

14. The dust trap of claim 13 in which a chamber-defining wall is connected to the end of said guide wall nearest said angled, opposed wall, said chamber-defining wall being angled to said guide wall and extending from said guide wall to define part of one side of one said circulation chamber which extends under said guide wall to transversely enlarge said circulation chamber.

15. The dust trap of claim 12 in which a lower portion of said angled, opposed wall defines an aperture communicating with a dust collection bin in which a portion of said angled, opposed wall extends forwardly and downwardly beyond said apex, to facilitate creation of a stagnant area below said opposed wall portion in said dust collection bin.

16. The dust trap of claim 12 in which at least one door member is defined for removing collected dust, said door member tending to spontaneously close when the dust trap is in its position of use, said door member tending to spontaneously open when the door member is tipped over to dumping position.

* * * * *